United States Patent
Lee et al.

(10) Patent No.: US 9,564,755 B2
(45) Date of Patent: Feb. 7, 2017

(54) METHOD AND APPARATUS FOR MANAGING POWER OF SMART APPLIANCE

(75) Inventors: Ji-Hye Lee, Gyeonggi-do (KR); Wuk Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 585 days.

(21) Appl. No.: 13/362,950

(22) Filed: Jan. 31, 2012

(65) Prior Publication Data

US 2012/0197455 A1    Aug. 2, 2012

(30) Foreign Application Priority Data

Jan. 31, 2011    (KR) .................. 10-2011-0009791

(51) Int. Cl.
*G06F 1/32*    (2006.01)
*H02J 3/14*    (2006.01)
*H02J 3/00*    (2006.01)

(52) U.S. Cl.
CPC .............. *H02J 3/14* (2013.01); *H02J 3/008* (2013.01); *H02J 2003/143* (2013.01); *Y04S 20/242* (2013.01); *Y04S 50/10* (2013.01)

(58) Field of Classification Search
CPC ........ H02J 3/008; H02J 3/14; H02J 2003/143; H02J 2003/146; Y04S 50/10; Y04S 20/221; Y04S 20/222; Y04S 20/224; Y04S 20/225; Y04S 20/242; Y02B 70/3225; Y02B 70/3226; Y02B 70/3216; Y02B 70/3233; Y02B 70/3241
USPC .......................... 700/286, 295, 296; 705/412
See application file for complete search history.

(56) References Cited

U.S. PATENT DOCUMENTS

| | | | |
|---|---|---|---|
| 6,487,509 B1 | 11/2002 | Aisa | |
| 6,671,586 B2* | 12/2003 | Davis et al. | 700/295 |
| 6,862,498 B2* | 3/2005 | Davis et al. | 700/295 |
| 7,274,975 B2 | 9/2007 | Miller | |
| 7,289,887 B2* | 10/2007 | Rodgers | 700/295 |
| 7,349,766 B2* | 3/2008 | Rodgers | 700/295 |
| 7,451,019 B2* | 11/2008 | Rodgers | 700/295 |
| 7,561,977 B2* | 7/2009 | Horst | H02J 3/14 700/295 |
| 7,715,951 B2* | 5/2010 | Forbes et al. | 700/291 |
| 7,738,999 B2* | 6/2010 | Petite | 700/295 |
| 7,840,383 B2* | 11/2010 | Wang | 702/188 |

(Continued)

FOREIGN PATENT DOCUMENTS

JP    2004-104863    4/2004

OTHER PUBLICATIONS

European Search Report dated Nov. 17, 2016 issued in counterpart application No. 12742072.7-1804, 7 pages.

*Primary Examiner* — Charles Kasenge
(74) *Attorney, Agent, or Firm* — The Farrell Law Firm, P.C.

(57) ABSTRACT

A method and apparatus for managing power of a smart appliance is provided. The method includes acquiring, from the smart appliance, by an Energy Management System (EMS) for managing power of the smart appliance at home over a home network, terminal information including function information and power consumption information; monitoring power of the smart appliance and transmitting results of the results to an energy service provider; and controlling, upon receiving a power reduction command from the energy service provider, the power of the smart appliance based on the acquired terminal information.

19 Claims, 4 Drawing Sheets

(56) References Cited

U.S. PATENT DOCUMENTS

| | | | |
|---|---|---|---|
| 8,010,812 B2* | 8/2011 | Forbes et al. | 713/300 |
| 8,032,233 B2* | 10/2011 | Forbes et al. | 700/22 |
| 8,160,752 B2* | 4/2012 | Weaver et al. | 700/295 |
| 8,260,471 B2* | 9/2012 | Storch et al. | 700/295 |
| 8,335,596 B2* | 12/2012 | Raman et al. | 700/295 |
| 8,344,665 B2* | 1/2013 | Verfuerth et al. | 315/315 |
| 8,369,998 B2* | 2/2013 | Drake et al. | 700/295 |
| 8,406,937 B2* | 3/2013 | Verfuerth et al. | 700/296 |
| 8,412,387 B2* | 4/2013 | Park | G06Q 50/06 307/118 |
| 8,417,393 B2* | 4/2013 | Drake et al. | 700/296 |
| 8,504,216 B2* | 8/2013 | Besore | 700/295 |
| 8,543,250 B2* | 9/2013 | Seo et al. | 700/296 |
| 8,600,556 B2* | 12/2013 | Nesler et al. | 700/275 |
| 8,618,452 B2* | 12/2013 | Besore et al. | 219/702 |
| 8,666,559 B2* | 3/2014 | Verfuerth et al. | 700/295 |
| 9,020,769 B2* | 4/2015 | Rada | G01D 4/00 702/176 |
| 9,310,792 B2* | 4/2016 | Lu | G05B 19/042 |
| 2003/0225483 A1* | 12/2003 | Santinato et al. | 700/295 |
| 2003/0233201 A1 | 12/2003 | Horst et al. | |
| 2006/0259199 A1* | 11/2006 | Gjerde et al. | 700/284 |
| 2009/0243517 A1* | 10/2009 | Verfuerth et al. | 315/315 |
| 2009/0248217 A1* | 10/2009 | Verfuerth et al. | 700/295 |
| 2010/0010683 A1 | 1/2010 | Kates | |
| 2010/0070099 A1* | 3/2010 | Watson et al. | 700/295 |
| 2010/0082174 A1* | 4/2010 | Weaver | 700/295 |
| 2010/0138363 A1* | 6/2010 | Batterberry et al. | 705/412 |
| 2010/0179708 A1* | 7/2010 | Watson et al. | 700/296 |
| 2010/0207728 A1* | 8/2010 | Roscoe | H02J 3/14 340/10.1 |
| 2010/0321574 A1 | 12/2010 | Kerofsky | |
| 2011/0098869 A1* | 4/2011 | Seo et al. | 700/296 |
| 2011/0175742 A1* | 7/2011 | Shin et al. | 340/635 |
| 2011/0196547 A1* | 8/2011 | Park | G06Q 50/06 700/296 |
| 2012/0016528 A1* | 1/2012 | Raman et al. | 700/291 |
| 2012/0053739 A1* | 3/2012 | Brian et al. | 700/287 |

* cited by examiner

METHOD AND APPARATUS FOR MANAGING POWER OF SMART APPLIANCE

PRIORITY

This application claims priority under 35 U.S.C. §119(a) to a Korean Patent Application filed in the Korean Intellectual Property Office on Jan. 31, 2011 and assigned Serial No. 10-2011-0009791, the entire content of which is incorporated herein by reference.

BACKGROUND OF THE INVENTION

1. Field of the Invention

The present invention relates generally to a smart grid, and more particularly, to a method and apparatus for managing the power or energy of smart appliances in the smart grid.

2. Description of the Related Art

Coinciding world-wide energy conservation efforts, many studies have been recently conducted on technologies for minimizing power consumption. Among these technologies, a smart grid is an intelligent power network formed by the convergence of the power network and the information and communication technology to make it possible to more efficiently use the electricity. Smart grid technology allows consumers and power companies to exchange information with each other in real time by combining the power network with the information and communication technologies such as ZigBee and Power Line Communication (PLC), so the consumers may use the electricity when the electrical charge is cheaper, facilitating efficient power management, such that smart appliances may automatically operate during periods where the rates for electricity usage are low. Herein "Zigbee" and "Power Line Communication" refer to devices, systems, and communications protocols in accordance with ZIGBEE® and POWER LINE COMMUNICATION® standards, respectively.

Key technologies related to usage of smart grids include management of user power. In order to manager power usage, several proposals for devices such as smart meters, smart buildings, and smart appliances, as well as proposals for consumer voltage regulation have been made.

Conventional power control systems used in conjunction with a smart grid may include a smart meter and smarter appliances. Smart appliances receive power usage information directly from the smart meter, and individually perform respective power control operations based on the received power usage information. In order to support these individually performed power control operations, the smart appliances support energy profiles. However, since all smart appliances at home operate independently, it is difficult to perform a power distribution service between devices through currently-provided power control schemes, resulting in relatively low energy saving effects. Such power control schemes may also fail to ensure flexible power management, because such schemes rely upon collectively controlling power without considering the individual characteristics of each controlled smart appliance.

An Open Mobile Alliance (OMA) Device Management (DM) operation, which a typical example of the conventional remote device management methods, is described as follows. OMA DM manages firmware, software and parameters in wireless communication terminals by reading, adding, deleting, changing and executing objects on the terminals using a DM protocol based on the Synchronization Markup Language (SyncML). This DM method generally operates through peer-to-peer communications. More specifically, the DM method sets up a peer-to-peer session between a DM server in the network and a DM client provided in a wireless communication terminal and enables exchange of messages defined in the DM protocol, so the DM server may allow the DM client to add/delete/change specific configuration in its terminal or to perform a specific operation thereof.

The DM protocol is defined with a total of 5 messages/packages: package #0~package #4. A DM session may be formed between the DM server and the terminal (or DM client) based on the DM protocol. The DM session may be initiated by the DM server or the DM client.

Figure 1:
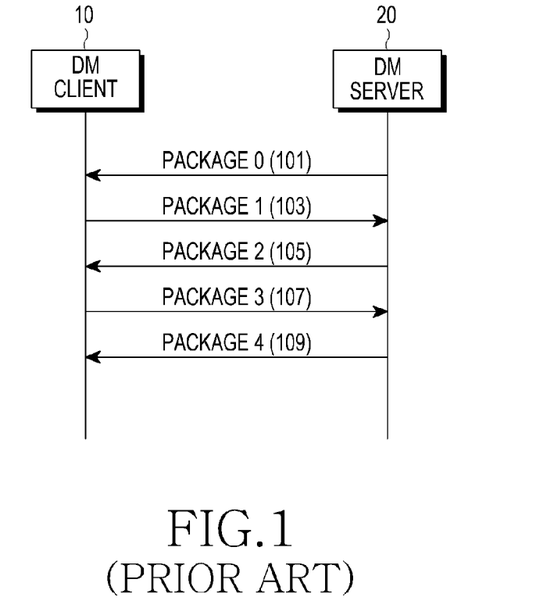
FIG. 1 is a flow diagram illustrating a conventional client management operation using a DM protocol.

FIG. 1 is a diagram illustrating a conventional client management operation using a DM protocol.

Referring to FIG. 1, if there is a management operation to be performed with respect to a specific device (or terminal), a DM server 20 sends a notification a package #0 message to a specific device (i.e., a DM client 10 provided in the specific device), in step 101, which informs the DM client 10 of the presence of a DM action. Upon receiving the package #0 notification message, the DM client 10 sends a package #1 message to the DM server 20, in step 103, which is a request to form a DM session. Even though the package #0 message may not have received yet, the DM client 10 may update its terminal function by requesting a DM session from the DM server 20 periodically, or as necessary.

The DM server 20, in order to permit setup of a DM session, sends the DM client 10 a package #2 message carrying a DM command for a management operation on a waiting terminal, in step 105. In response to the package #2 message, the DM client 10 sends a package #3 message to the DM server 20, in step 107, to deliver the execution results of the DM command received from the DM server 20.

In step 109, the DM server 20 either terminates the DM session or delivers an additional management operation to the DM client 10 using a package #4 message, and the DM client 10 performs the additional management operation indicated by the package #4 message and reports the execution results to the DM server 20 using the package #3 message. After the execution results are reported, the DM server 20 and the DM client 10 may provide management operations or management commands by repeating the package #4 message and the package #3 message. In this case, if a management operation is continuously included in the package #4 message, the DM session is maintained. However, if there is no additional management operation, the DM session is terminated. As described above, in the remote management by the DM protocol, the DM server directly controls all terminals.

SUMMARY OF THE INVENTION

An aspect of the present invention provides a method and apparatus for managing the power of a smart appliance taking into account characteristics of each smart appliance and its user preference in a smart grid.

In accordance with one aspect of the present invention, a method for managing power of a smart appliance is provided. The method includes acquiring, from the smart appliance, by an Energy Management System (EMS) for managing power of the smart appliance at home over a home network, terminal information including function information and power consumption information; monitoring power of the smart appliance and transmitting results of the results to an energy service provider; and controlling, upon receiving a power reduction command from the energy service provider, the power of the smart appliance based on the acquired terminal information.

In accordance with another aspect of the present invention, an apparatus for managing power of a smart appliance is provided. The apparatus includes an input unit for receiving an input signal from a user; a display for outputting display information; a communication unit for performing communication with the smart appliance and a smart meter; a storage unit for storing terminal information including function information and power consumption information of the smart appliance; a controller for acquiring terminal information including function information and power consumption information from the smart appliance, monitoring power of the smart appliance, and transmitting results of the monitoring to an energy service provider; and a power adjustment unit for controlling the power of the smart appliance based on the acquired terminal information according to a control signal from the controller, upon receiving a power reduction command from the energy service provider through the communication unit.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Embodiments of the present invention are described in detail as follows with reference to the accompanying drawings. In the following description, specific details of certain configurations and components are provided to assist the overall understanding of embodiments of the present invention. Accordingly, various changes and modifications of the embodiments described herein can be made without departing from the scope and spirit of the invention. In addition, descriptions of well-known functions and constructions may be omitted for clarity and conciseness.

Figure 2:
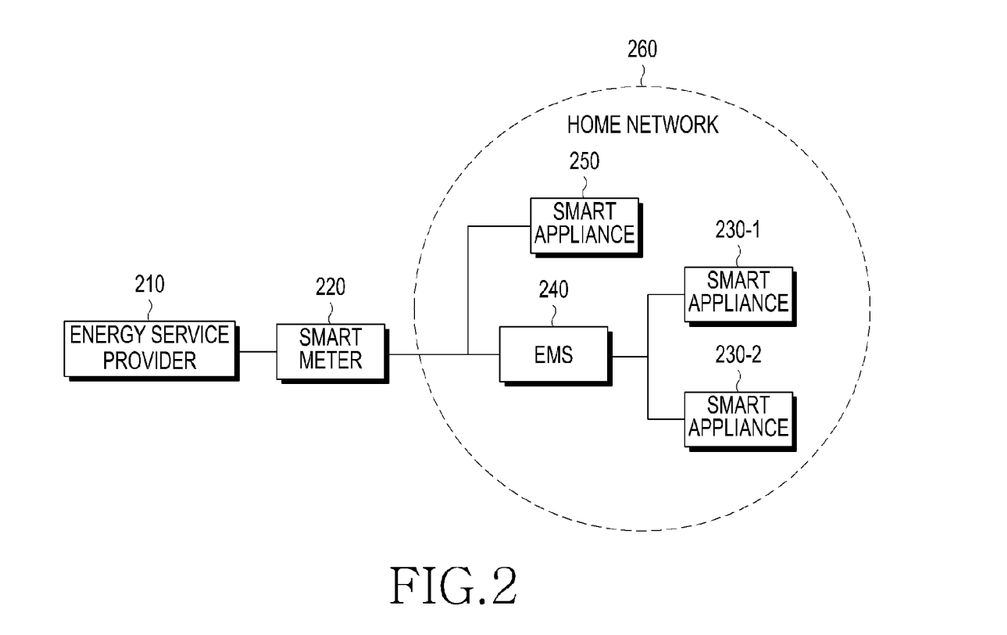
FIG. 2 is a diagram illustrating a configuration of a home power system according to an embodiment of the present invention.

FIG. 2 is a diagram illustrating a configuration of a home power system according to an embodiment of the present invention.

Referring to FIG. 2, a home power system according to an embodiment of the present invention may include an Energy Service Provider (ESP) 210 for providing power, a smart meter 220 for measuring the power usage of smart appliances, an Energy Management System (EMS) 240 for managing energy use in the home network, and at least one smart appliance, such as smart appliances 230-1, 230-2 and 250.

The smart appliances are divided into the smart appliances 230-1 and 230-2 connected to the smart meter 220 via the EMS 240, and the smart appliance 250 directly connected to the smart meter 220. According to an embodiment of the present invention, the power management targets include the smart appliances 230-1 and 230-2 connected to the smart meter 220 through the EMS 240. The EMS 240 in the home network distributes the power of these smart appliances 230-1 and 230-2.

Figure 3:
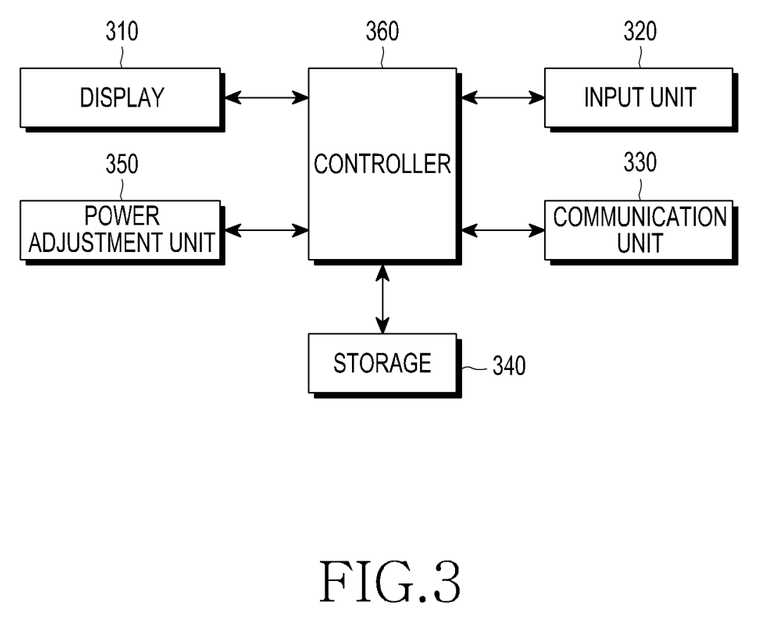
FIG. 3 is a diagram illustrating a structure of a power management apparatus for smart appliances according to an embodiment of the present invention.

FIG. 3 is a diagram illustrating a structure of a power management apparatus (e.g., an EMS apparatus) for smart appliances according to an embodiment of the present invention.

Referring to FIG. 3, a power management apparatus according to an embodiment of the present invention may include an input unit 320, a display 310, a communication unit 330, a storage unit 340, a power adjustment unit 350, and a controller 360.

The input unit 320 includes an input device such as a keypad and/or a touch screen, and receives input signals from a user through the input device.

The display 310 includes a display device such as a Liquid Crystal Display (LCD), and outputs display information on the display device. When a touch screen is mounted thereon, the display 310 may also serve as the input unit 320.

The communication unit 330 communicates with the smart appliances 230 and the smart meter 220 through a wired/wireless communication scheme such as Power Line Communication (PLC) and ZigBee communication schemes.

The storage unit 340 stores information the EMS 240 requires in order to operate. According to an embodiment of the present invention, the storage unit 340 stores terminal information corresponding to each smart appliance 230. The terminal information includes information about a terminal type, power consumption, power supply class, terminal function list, power management method, etc. of each respective connected smart appliance connected via the EMS 240. Herein, "smart appliance 230" refers generally to a smart appliance connected via the EMS 240 (e.g., either of smart appliances 230-1 and 230-2).

The power adjustment unit 350 manages the power of each smart appliance 230 by controlling the power consumption taking into account information about each smart appliance 230 according to a power control command received from the energy service provider 210 through the smart meter 220.

The controller 360 controls each component of the EMS 240.

According to an embodiment of the present invention, the controller 360 acquires terminal information including function information and power consumption information from the smart appliance 230, monitors the power of the smart appliance 230, and transmits the monitoring results to the energy service provider 210.

According to an embodiment of the present invention, upon receiving a power reduction command from the energy service provider 210 through the communication unit 330, the power adjustment unit 350 controls the power of the smart appliance 230 based on the terminal information acquired according to the control signal from the controller 360.

The controller 360 receives an energy profile from the energy service provider 210, acquires terminal information including function information and power consumption information from the smart appliance 230, and stores the acquired terminal information in the storage unit 340. The received energy profile may include only changes in existing energy profile information shared for a particular smart grid service.

The terminal information may include information about terminal type, power consumption, power supply class, terminal function list, power management method, etc.

The power supply class may be set to any one of an always-on mode, a power saving mode, and an off-during peak time mode, while the power management method may be set to any one of a manual mode for manually controlling the power by interaction with a user and an automatic mode for automatically (or in response to a specific command) controlling the function of the smart appliance.

The power reduction command includes information about at least one of an amount of reduction in power and a time for which the power usage is to be limited.

The power adjustment unit 350 selects a smart appliance 230 whose power is to be controlled and a terminal function to be controlled in the smart appliance 230, based on the acquired terminal information. If the power management method is set to the manual mode, the power adjustment unit 350 sends a power control command to the smart appliance 230 through the communication unit 330, and receives the power control results from the smart appliance 230. Otherwise, the power adjustment unit 350 selects the smart appliance 230 whose power is to be controlled and a terminal function to be controlled in the smart appliance 230, based on the acquired terminal information. If the power management method is set to the automatic mode, the EMS 240 automatically controls the selected function of the smart appliance 230.

According to an alternative embodiment of the present invention, the power adjustment unit 350 may select the smart appliance 230 whose power is to be controlled and a terminal function to be controlled in the smart appliance 230, based on the acquired terminal information and previously stored user preference information.

The user preference information may include information about any one of a level where each of smart appliance should always be powered on, a level where the smart appliance should operate at a higher priority than other smart appliances, and a level where the smart appliance may stop an operation thereof, and may also include information about other levels, wherein the levels represent priority level of electric power supply that can be set by the user.

Figure 4:
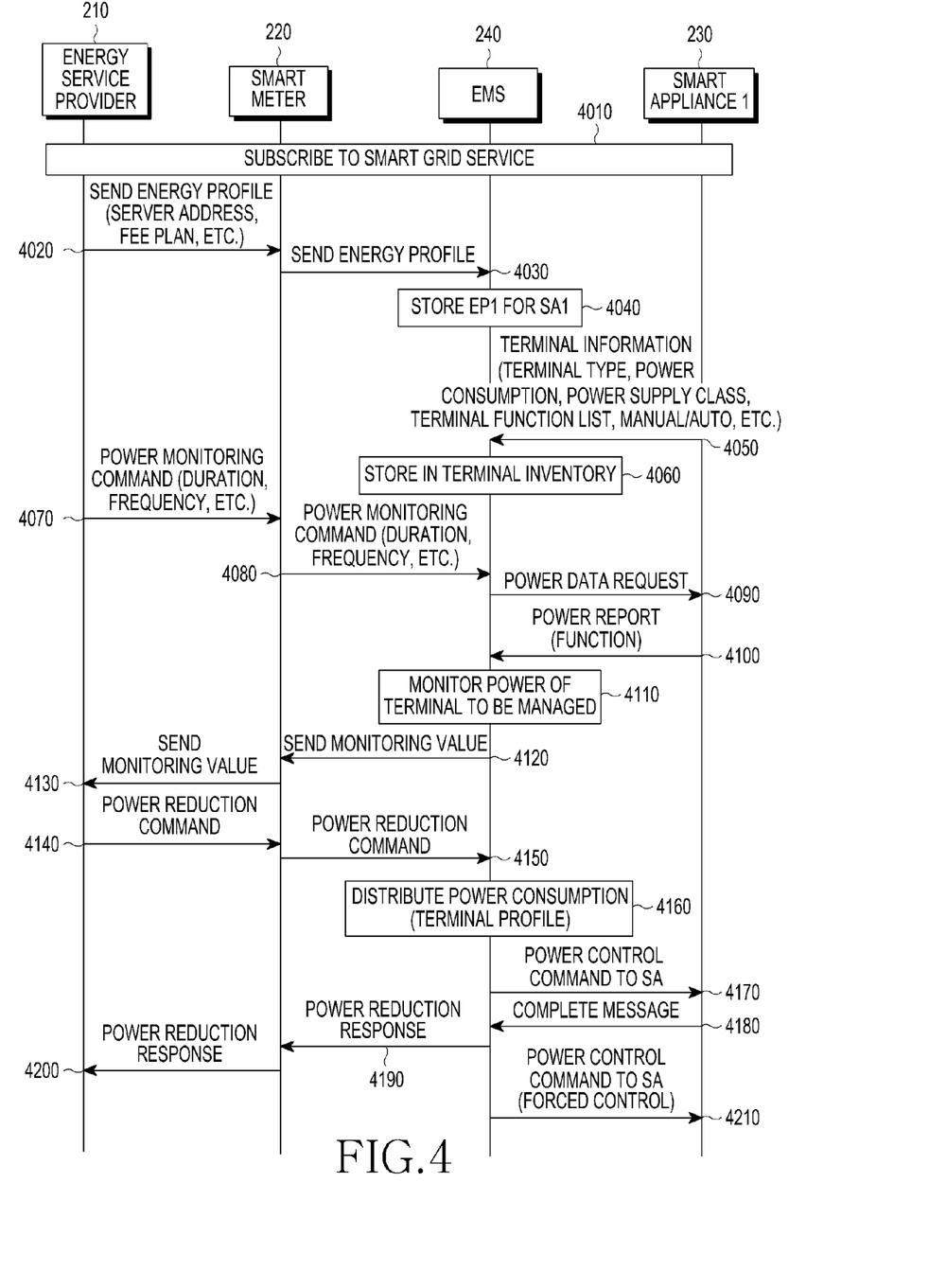
FIG. 4 is a flow diagram illustrating an operation flow of a method for managing the power of a smart appliance according to an embodiment of the present invention.

FIG. 4 is a flow diagram illustrating an operation flow of a method for managing the power of a smart appliance according to an embodiment of the present invention.

Figure 5:
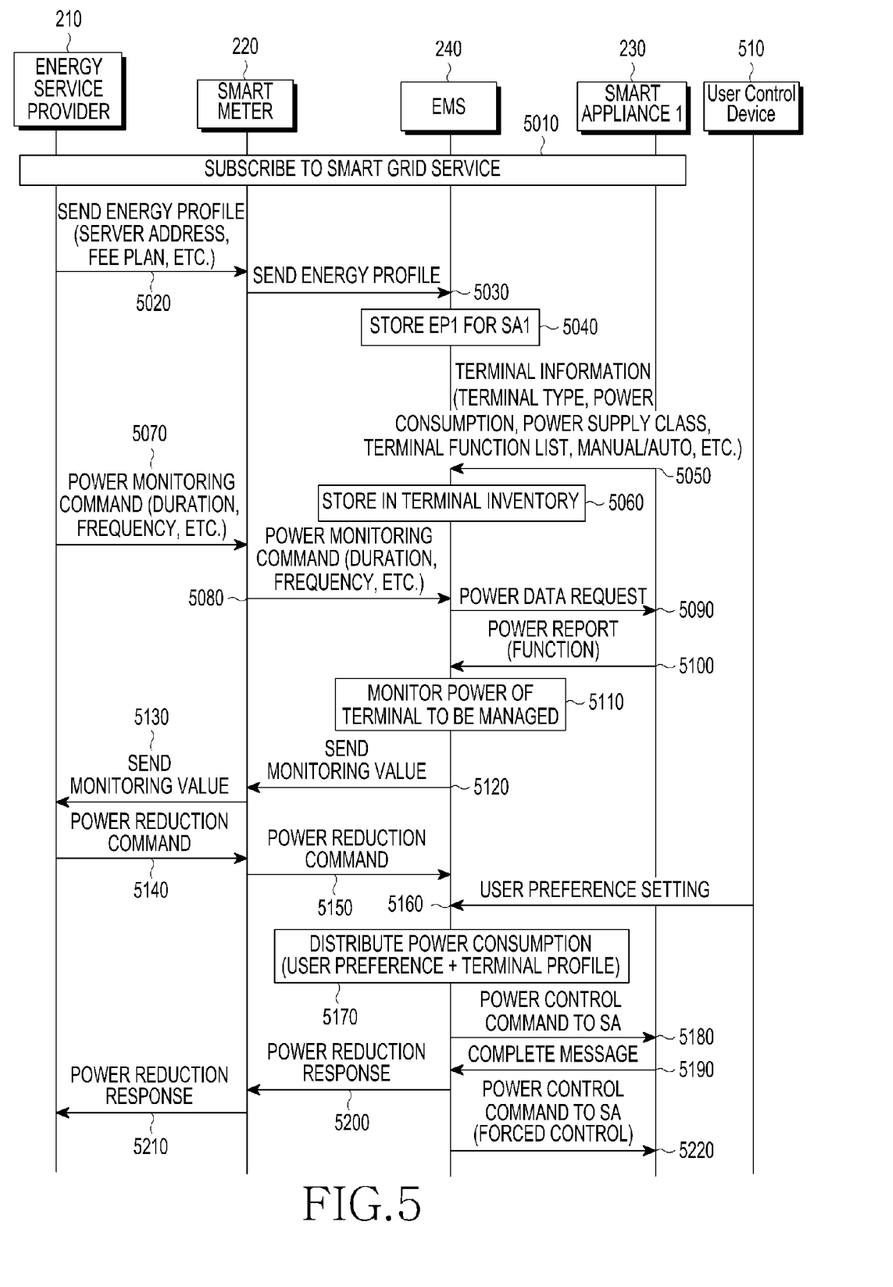
FIG. 5 is a flow diagram illustrating an operation flow of a method for managing the power of a smart appliance according to another embodiment of the present invention.

Referring to FIG. 4, the energy service provider 210, the smart meter 220, the EMS 240, and the smart appliance 1 230 subscribe to the smart grid service, in step 4010. A user may subscribe to the smart grid service though various operations, such as by receiving a subsidy from an energy service provider 210, or may directly subscribe in a retail market, for example. Although FIGS. 4 and 5 illustrate only a single smart appliance 1 230 connected via the EMS 240, there may be other smart appliances 230 (not shown) connected via the EMS 240, such as illustrated in FIG. 2.

The energy service provider 210 sends an energy profile to the smart meter 220 in step 4020, and the smart meter 220 forwards the energy profile to the EMS 240 in step 4030. The energy profile may include information about a server address, a fee plan, etc. A push message may be used to send the energy profile, and the energy profile may be a downloadable profile. In subscribing to the smart grid service in step 4010, the components may share energy profile information. When the components share energy profile information, the energy profile information delivered in steps 4020 and 4030 may include only information that has been changed (or updated) from among energy profile information shared during an initial subscription.

The EMS 240 stores the energy profile for the smart appliance 1 230 in step 4040, and receives terminal information from the smart appliance 1 230 in step 4050. The terminal information may include information about terminal type, power consumption, power supply class, terminal function list, power management method, etc. The power management method may be either of a manual mode and an automatic mode. The manual mode is a scheme for manually controlling the power through interaction with a user, while the automatic mode is a scheme for controlling the power by automatically controlling the function of the smart appliance. The power supply class may be set to any one of an always-on mode, a power saving mode, and an off-during peak time mode. The EMS 240 may prioritize each smart appliance 1 230 and its terminal functions. Accordingly, when controlling the power consumption, the EMS 240 may select the smart appliance 1 230 whose power is to be controlled and a terminal function to be controlled in the smart appliance 1 230, according to the priority.

In step 4060, the EMS 240 stores the terminal information received in step 4050 in a terminal inventory. The terminal inventory may be formed in the storage 340 of the EMS 240.

In step 4070, the energy service provider 210 sends a power monitoring command to the smart meter 220. In step 4080, the smart meter 220 forwards the power monitoring command to the EMS 240. The power monitoring command may include monitoring duration and frequency information.

The EMS 240 sends a power data request to the smart appliance 1 230, in step 4090, and receives a power report from the smart appliance 230 1, in step 4100. The power report may include information about the power of each function of the smart appliance 1 230. The power data request and the power report may be achieved by exchanging proprietary messages between the EMS 240 and the smart appliance 230. The EMS 240 may directly collect the power data when the smart appliance 1 230 does not have a data transmission function. When the smart appliance 1 230 does not have a data transmission function, an OMA Diagnostics Management Object (DiagMon) may be used.

The EMS 240 monitors the power of terminals to be managed, in step 4110, and sends a monitoring value (or the monitoring results) to the smart meter 220 in step 4120. The smart meter 220 forwards the monitoring value to the energy service provider 210, in step 4130.

The energy service provider 210 may generate a power control command according to the monitoring value. According an embodiment of the present invention, the energy service provider 210 may generate and send a power reduction command. In step 4140, the energy service provider 210 sends a power reduction command to the smart meter 220 to reduce the power consumption of smart appliances 230. The power reduction command may include information about the amount of reduction in power and the time for which the power usage is to be limited. This amount of reduction may be indicated as a percentage. In step 4150, the smart meter 220 forwards the power reduction command to the EMS 240.

In step 4160, the EMS 240 distributes the power consumption of the smart appliances 230 connected thereto taking in consideration of the terminal information received in step 4050. The EMS 240 may a low-priority smart appliance 1 230 among the smart appliances 230 connected thereto to reduce its power consumption before issuing such a command to other smart appliances 230.

If the power management method included in the terminal information from the smart appliance 1 230 is a manual mode, the EMS 240 sends a power control command to the smart appliance 1 230 in step 4170. In this case, the EMS 240 may first send a power control command for reducing the power consumption to the low-priority smart appliance 1 230 taking into account of the priorities of the smart appliances 230. The power control command may include a function change request constructed to change at least one of the functions of the smart appliance 1 230. For example, if the smart appliance 1 230 is an air conditioner, if the power control command includes may include a function change request to increase the set temperature of the air conditioner. The air conditioner, upon receiving the power control command, analyzes the received power control command and displays on its display window a message instructing to increase the set temperature of the air conditioner, which is a function change request for the air conditioner, allowing the user to easily change the function of the smart appliance to a proper level.

After the power control command is sent in step 4170, if the power control is performed manually, the EMS 240 receives a power control complete message from the smart appliance 230 in step 4180. However, if no power control is performed, the EMS 240 receives a message indicating incompletion of the power control from the smart appliance 230, in step 4180. In this case, i.e., when no power control is performed the EMS 240 may subsequently send a power control command to another smart appliance 230. Therefore, in FIG. 4, the operation of steps 4170 and 4180 may be performed several times until the desired power reduction is completed.

After the completion message is received in step 4180, the EMS 240 sends a response to the power reduction command to the smart meter 220, in step 4190. The smart meter 220 forwards the power reduction response to the energy service provider 210 in step 4200.

During the distribution of the power consumption in step 4160, if the power management method included in the terminal information from the smart appliance 230 is an automatic mode, the EMS 240 automatically controls the low-priority function of the smart appliance 230 first taking into account the priorities of several functions of the smart appliance 230. When an automatic mode is used, steps 4190 and 4200 are not performed, and the EMS 240 automatically controls each smart appliance 230 through required commands, in step 4210. For example, if smart appliances 230 such as an air conditioner, a refrigerator, a washer, a TV and a lighting are in operation, if the refrigerator has the highest priority and the air conditioner or the lighting has the lowest priority, the EMS 240 may automatically control the power consumption by changing the functions of the smart appliances 230 such as increasing the set temperature of the air conditioner by a predetermined level using a temperature control function and reducing the light intensity of the lighting, in order to reduce the power consumption. The EMS 240 may automatically change the functions of each smart appliance 230 in sequence according to their priorities until the power consumption arrives at the desired power consumption. For example, after changing the functions of the lighting and the air conditioner, power consumption regulated by the EMS 240 may arrive at the desired power consumption by changing the function of the washer such as changing or stopping the course of the washer whose priority is higher than that of the lighting and the air conditioner.

FIG. 5 is a flow diagram illustrating an operation flow of a method for managing the power of a smart appliance according to another embodiment of the present invention.

The operations of FIG. 5 are similar to the operations FIG. 4 on the whole, but it further include a process in which the EMS 240 receives user preference information from a user control device 510 in step 5160 before distributing the power consumption in step 5170.

Accordingly, in step 5170, the EMS 240 distributes the power consumption based on the user preference information in addition to the terminal information.

The user control device 510 may refer to an electronic device capable of communicating with the EMS 240 over the communication network, such as a smart phone, a notebook computer, etc.

The user preference information may include a preference level of each smart appliance 230, which may be set by the user. The preference level may include a level indicating that the corresponding smart appliance should always be powered on, a level indicating that the smart appliance should operate at a higher priority than other smart appliances, and a level indicating that operations of the smart appliance may be stopped. Accordingly, during the distribution of the power consumption in step 5170, the EMS 240 controls the power taking into account these user preference levels in addition to the terminal information.

As is apparent from the foregoing description, power management methods and apparatuses according to embodiments of the present invention may manage the power of smart appliances in consideration of the characteristics of each smart appliance and the user preference in the smart grid.

The EMS according to embodiments of the present invention may smoothly perform power control despite the low processing capabilities of the smart appliances because it issues all control commands.

The described power management methods and apparatuses according to embodiments of the present invention may acquire information about the power consumed by the smart appliances in advance and distributes the power based upon the acquired information, making it possible to reduce the initial setting time compared with operating smart appliances, measuring the power consumption by the operation, and distributing the power based on the measurement.

The described power management methods and apparatuses according to embodiments of the present invention control power by changing operations of components in order of the low priority taking into account the main functions of the smart appliances among the components of each smart appliance based on the information about the power consumed in advance and the priority information provided together, making it possible to minimize the reduction in user convenience due to the change in operation of the smart appliances by the power control and to minimize the influence such as the change in efficiency of working by the smart appliances or specific functions thereof.

In accordance with these power control operation flows, the proposed power management method and apparatus controls the power of smart appliances in consideration of power reduction commands received from the Energy Service Provider (ESP), the previously stored terminal information of smart appliances, and the user preference levels received from the user control device.

While the operation and structure of the method and apparatus for managing the power of smart appliances according to embodiments of the present invention have been shown and described, it will be understood by those skilled in the art that various changes in form and details may be made therein without departing from the spirit and scope of the invention as defined by the appended claims and their equivalents.

What is claimed is:

1. A method for managing power of a smart appliance, comprising:
   acquiring, from the smart appliance, by an Energy Management System (EMS) for managing power of the smart appliance at home over a home network, terminal information including information about functions supported by the smart appliance and power consumption of the smart appliance;
   monitoring power of the smart appliance and transmitting monitoring results to an energy service provider; and
   controlling, upon receiving a power reduction command, the power of the smart appliance based on the acquired terminal information and previously stored user preference information associated with a control of power of each of a plurality of smart appliances,
   wherein the information about functions supported by the smart appliance and power consumption of the smart appliance indicates a power supply class of the smart appliance, and
   wherein the user preference information indicates a level where each of a plurality of smart appliances is always powered on.

2. The method of claim 1, wherein acquiring the terminal information comprises:
   receiving, from the energy service provider, an energy profile;
   acquiring, from the smart appliance, the terminal information including information about functions supported by the smart appliance and power consumption of the smart appliance; and
   storing the acquired terminal information.

3. The method of claim 2, wherein the received energy profile includes a change in existing energy profile information shared for a smart grid service.

4. The method of claim 1, wherein the information about functions supported by the smart appliance and power consumption of the smart appliance further indicates a terminal type of the smart appliance, power consumption of the smart appliance, a terminal function list of the functions supported by the smart appliance, and a power management method of the smart appliance.

5. The method of claim 4, wherein the power supply class is set to any one of an always-on mode, a power saving mode, and an off-during peak time mode.

6. The method of claim 4, wherein the power management method is set to any one of a manual mode for manually controlling the power by interaction with a user, and an automatic mode for automatically controlling a function of the smart appliance.

7. The method of claim 6, wherein the controlling the power of the smart appliance comprises:
   selecting a smart appliance whose power is to be controlled and a terminal function to be controlled in the smart appliance, based on the acquired terminal information and the previously stored user preference information;
   sending, if the power management method is set to a manual mode, a power control command to the smart appliance; and
   receiving power control results from the smart appliance.

8. The method of claim 6, wherein the controlling the power of the smart appliance comprises:
   selecting a smart appliance whose power is to be controlled and a terminal function to be controlled in the smart appliance, based on the acquired terminal information and previously stored user preference information; and
   if the power management method is set to an automatic mode, controlling the selected terminal function of the smart appliance.

9. The method of claim 1, wherein the user preference information further indicates at least one of a level where the smart appliance operates at a higher priority than other smart appliances, and a normal level where the smart appliance operates at a lowest priority than the other smart appliances.

10. The method of claim 1, wherein the power reduction command includes information indicating an amount of reduction in power.

11. An apparatus for managing power of a smart appliance, comprising:
   an input unit for receiving an input signal from a user;
   a display for outputting display information;
   a communication unit for performing communication with the smart appliance and a smart meter and acquiring terminal information including information about functions supported by the smart appliance and power consumption of the smart appliance;
   a storage unit for storing terminal information including information about functions supported by the smart appliance and power consumption of the smart appliance;
   a controller for monitoring power of the smart appliance, and transmitting results of the monitoring to an energy service provider; and
   a power adjustment unit for controlling the power of the smart appliance based on the acquired terminal information and previously stored user preference information including information indicating a level where each of a plurality of smart appliances must always be powered on, a level where the smart appliance must operate at a higher priority than other smart appliances, and a normal level according to a control signal from the controller, upon receiving a power reduction command from the energy service provider through the communication unit,
   wherein the information about functions supported by the smart appliance and power consumption of the smart appliance indicates a power supply class of the smart appliance, and
   wherein the user preference information indicates a level where each of a plurality of smart appliances is always powered on.

12. The apparatus of claim 11, wherein the controller receives an energy profile from the energy service provider, acquires the terminal information including information about functions supported by the smart appliance and power consumption of the smart appliance, and stores the acquired terminal information in the storage.

13. The apparatus of claim 12, wherein the received energy profile includes a change in existing energy profile information shared for a smart grid service.

14. The apparatus of claim 11, wherein the information about functions supported by the smart appliance and power consumption of the smart appliance further indicates a terminal type of the smart appliance, power consumption of the smart appliance, a terminal function list of the functions supported by the smart appliance, and a power management method of the smart appliance.

15. The apparatus of claim 14, wherein the power supply class is set to any one of an always-on mode, a power saving mode, and an off-during peak time mode.

16. The apparatus of claim 14, wherein the power management method is set to any one of a manual mode for manually controlling the power by interaction with a user, and an automatic mode for automatically controlling a function of the smart appliance.

17. The apparatus of claim 16, wherein the power adjustment unit selects a smart appliance whose power is to be controlled and a terminal function to be controlled in the smart appliance, based on the acquired terminal information and the previously stored user preference information, sends, if the power management method is set to a manual mode, a power control command to the smart appliance through the communication unit, and receives power control results from the smart appliance.

18. The apparatus of claim 16, wherein the power adjustment unit selects a smart appliance whose power is to be controlled and a terminal function to be controlled in the smart appliance, based on the acquired terminal information and the previously stored user preference information, controls, if the power management method is set to an automatic mode, the selected terminal function of the smart appliance.

19. The apparatus of claim 11, wherein the power reduction command includes information indicating an amount of reduction in power.

* * * * *